UNITED STATES PATENT OFFICE 1,984,765

ARSENO-STIBIO COMPOUNDS AND MANUFACTURE THEREOF

Hans Schmidt, Wuppertal-Vohwinkel, Germany, assignor to Winthrop Chemical Company, Inc., New York, N. Y., a corporation of New York No Drawing. Application May 11, 1933, Serial No. 670,560. In Germany May 14, 1932

20 Claims. (Cl. 260—14)

The present invention relates to neutral, water-soluble derivatives of aminoarylarseno-stibio compounds and to a process of preparing the same.

In accordance with the present invention new water-soluble derivatives of aminoarylarseno-stibio compounds are obtained which apparently correspond to the general formula:

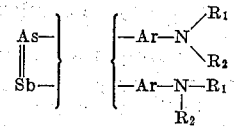

In this formula Ar stands for an aromatic radical of the benzene series, one $R_1$ stands for an aliphatic group substituted by at least one hydroxyl group, the other $R_1$ stands for a methane-sulfo group selected from the group consisting of $NaO_3S-CH_2-$ and $NaO_2S-CH_2-$ groups, and $R_2$ is hydrogen or a hydroxyalkyl group. Accordingly, it is an essential feature of the said new arseno-stibio compounds that they contain attached to the nucleus of the benzene series a hydroxyalkylamino group, on the one hand, a $NaO_3S-CH_2-NH-$ or $NaO_2S-CH_2-NH-$ group, on the other hand. One of these substituted amino groups may be further substituted by a hydroxyalkyl group. A typical representative of the new water-soluble aminoaryl-arseno-stibio compounds is, for instance, the compound of the following formula:

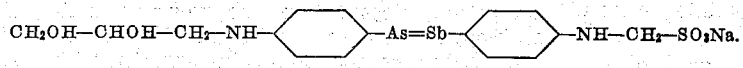

In accordance with the present invention the new neutral, water-soluble arseno-stibio compounds are obtained by reacting upon an aminophenyl arsine compound with an aminophenyl stibine compound, one of the reacting components being substituted in the amino group by an aliphatic group containing at least one hydroxy group, and subsequently reacting upon the arseno-stibio compound formed in the presence of water with a methane-sulfo derivative selected from the group consisting of formaldehyde-bisulfite and formaldehyde-sulfoxylate while neutralizing the reaction mixture. The aminophenyl arsine or stibine compound substituted by a hydroxyalkyl group and used as starting material in the above indicated reaction is obtained by reacting upon the aminoarylarsine or stibine with an alkylene oxide, such as ethylene-, propylene-, butylene-oxide, glycide, glucosane, dimethylaminopropylene-oxide, and the like, for instance, in accordance with the following equation:

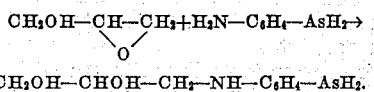

Alkyleneoxides of a carbon chain of 3 to 6 carbon atoms have been preferred in the said process. The use of glycide has proved particularly advantageous.

The condensation to the arseno-stibio compounds performs, for instance, in accordance with the following equation:

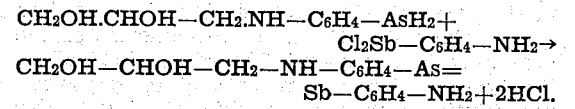

By the action of, for instance, formaldehyde-bisulfite the free amino group of the latter product is then substituted by the $NaO_3S-CH_2-$ group.

The aminoarylarsines, for instance, aminophenylarsine and a hydroxy-aminophenylarsine may be employed as such or in the form of their salts, preferably in the form of the acetate. For the sake of brevity the free arsines as well as their salts will be defined in the appended claims as an amino phenyl arsine. The aminoarylstibine compounds may be used in the form of oxides or halides. I prefer the use of the stibine chlorides, such as aminophenyl- or hydroxy-aminophenyl stibine chloride. The reaction between the arsine and stibine compound is performed in the presence of a solvent, such as water, alcohols or aqueous alcohols. Cooling of the reaction mixture, for instance, to 0° C., is sometimes advisable. Either the amino group of the arsine or the amino group of the stibine compounds should be substituted by the aliphatic group containing at least one hydroxyl group. The arseno-stibio compound formed is then caused to react with formaldehyde-bisulfite, formaldehyde and bisulfite, or formaldehyde-sulfoxylate either without isolation from the reaction mixture or after isolation. The reaction is performed in the presence of water. The reaction product formed is separated from the mixture advantageously by pouring the mixture into a water-soluble alcohol, such as methyl and ethyl alcohol.

In the above described manner yellow to brown substances are obtained which are insoluble in alcohols and yield neutral aqueous solutions which are suitable for injection in the treatment of infectious diseases, particularly in the treatment of bartonellae-infection.

It may be mentioned that the new compounds are also obtainable by condensation of an aminoaryl arsine and a stibine compound when each of the amino groups is already substituted, the one by a hydroxyalkyl group, the other by the NaO₃S—CH₂— or NaO₂S—CH₂— radical.

The aminoarylarseno-stibio compounds obtainable in the above described manner may subsequently be treated with an alkyleneoxide to introduce into one amino group a further hydroxyalkyl group. Such treatment with an alkyleneoxide may also be effected simultaneously with the action of the formaldehyde-bisulfite or formaldehyde-sulfoxylate.

The new products can also be prepared by treating aminoarylarseno-stibio compounds simultaneously or subsequently with an alkyleneoxide and formaldehyde-bisulfite or formaldehyde-sulfoxylate.

The invention is further illustrated by the following examples, but it is not limited thereto:

*Example 1.*—10 grams of 4-hydroxy-3-aminophenylarsine acetate are dissolved in about 100 ccs. of methyl alcohol while adding 12 ccs. of glycide. The solution is left standing in a closed vessel for about 3 days. The solution is then mixed at −10° C. with a solution of 13.5 grams of 4-hydroxy-3-aminophenyl stibine chloride in methyl alcohol. The temperature is caused to rise to about +5° C. The hydrochloride of the arseno-stibio compound formed is obtained in the form of a light yellow precipitate by pouring the solution into acetone while stirring. After separating and drying the precipitate 10 grams of the hydrochloride are dissolved in a small quantity of methyl alcohol, water and small pieces of ice are added and the solution is neutralized by addition of a dilute solution of caustic soda, whereupon the free base precipitates. 15 grams of formaldehyde-bisulfite are added and the mixture is shaken. After a few hours solution takes place. After short standing the solution is filtered and the reaction product formed is precipitated by pouring the solution into methyl alcohol while stirring. After separating and drying the precipitate the 4-hydroxy-3-dihydroxypropylamino - 4' - hydroxy - 3' - (formaldehyde - bisulfite-amino) -arseno-stibio benzene of the probable formula:

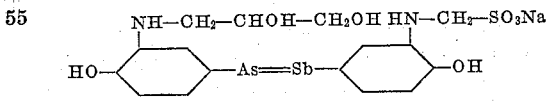

is obtained as a yellow powder which is readily soluble in water with neutral reaction.

In an analogous manner the reaction described in paragraph 2 of this example may also be performed by using instead of formaldehyde-bisulfite formaldehyde-sulfoxylate. Other alkylene oxides, such as ethylene oxide and propylene oxide may be used instead of glycide.

*Example 2.*—27 grams of 4-carbamido-3-dihydroxy-propylamino-phenyl stibine oxide, prepared by reacting upon 4-carbamido-3-aminophenyl-stibine chloride with glycide in methyl alcoholic solution rendered alkaline by diethylamino-ethanol, are dissolved in about 400 ccs. of water while cooling by the addition of ice. A solution of 10 grams of 4-hydroxy-3-aminophenyl-arsine acetate in 150 ccs. of methyl alcohol is added. A dilute aqueous solution of caustic soda is then added while stirring until solution takes place. After short standing the arseno-stibio compound formed is precipitated by acidifying the solution with dilute acetic acid in the form of a brownish yellow precipitate. The precipitate is sucked off, washed with water and the paste is shaken with water and 30 grams of formaldehyde-bisulfite until solution takes place. The red solution is filtered after about 24 hours and the reaction product precipitated by pouring the mixture into methyl alcohol while stirring. After separating the precipitate and drying in vacuo the formaldehyde-bisulfite compound of the 4-hydroxy-3-amino-4'-carbamido-3'-dihydroxypropylamino-arseno-stibio benzene is obtained in the form of a yellowish powder which readily dissolves in water to a neutral solution.

In an analogous manner other aminoarylstibine oxides pre-treated with an alkylene oxide, for instance, hydroxypropylamino - phenylstibinechloride-hydrochloride may be reacted with arsines in the above described manner.

Other aminoarylarsines, for instance, 4-aminophenyl-arsine, may be used instead of the 4-hydroxy-3-aminophenyl-arsine in the above described reaction. Other alkylene oxides, for instance, butylene oxide, diethylaminopropylene oxide and glucosane may be employed instead of glycide.

*Example 3.*—4.4'-dihydroxy-3.3'-diamino-arsenostibio benzene, freshly prepared by reacting upon 6.8 grams of 4-hydroxy-3-aminophenylstibinechloride-hydrochloride with the equivalent amount of 4-hydroxy-3-aminophenylarsine, are dissolved in the required quantity of a dilute solution of caustic soda and 2 grams of glycide are added to the solution. When the reaction is complete dilute hydrochloric acid is added until solution has again taken place. 2 grams of sodium bisulfite and 6 ccs. of a 30% formaldehyde solution and then 4 grams of bisulfite solution and dilute caustic soda lye are added so that the reaction is neutral. After short standing the solution obtained is filtered and the reaction product formed precipitated by pouring the solution into alcohol while stirring. A brown powder is obtained which dissolves readily in water to a neutral solution.

I claim:—

1. The process which comprises reacting an aminophenyl arsine with an aminophenyl stibine compound selected from the group consisting of aminophenyl stibine-oxides and halides, one of the reacting components being substituted in the amino group by an aliphatic group containing at least one hydroxy group, and subsequently reacting upon the arseno-stibio compound formed in the presence of water with a methane-sulfo derivative selected from the group consisting of formaldehyde-bisulfite and formaldehyde-sulfoxylate while neutralizing the reaction mixture.

2. The process which comprises reacting an aminophenyl arsine with an aminophenyl stibine compound selected from the group consisting of aminophenyl stibine-oxides and halides, one of the reacting components being substituted in the amino group by an aliphatic group of 3 to 6 carbon atoms containing at least one hydroxy group, and subsequently reacting upon the arseno-stibio compound formed in the presence of water with a methane-sulfo derivative selected from the group consisting of formaldehyde-bisulfite and formaldehyde-sulfoxylate while neutralizing the reaction mixture.

3. The process which comprises reacting an aminophenyl arsine with an aminophenyl stibine compound selected from the group consisting of aminophenyl stibine-oxides and halides, one of the reacting components being substituted in the amino group by the dihydroxypropyl group, and subsequently reacting upon the arseno-stibio compound formed in the presence of water with a methane-sulfo derivative selected from the group consisting of formaldehyde-bisulfite and formaldehyde-sulfoxylate while neutralizing the reaction mixture.

4. The process which comprises reacting an aminophenylarsine with an aminophenylstibine chloride, one of the reacting components being substituted in the amino group by an aliphatic group of 3 to 6 carbon atoms containing at least one hydroxy group, and subsequently reacting upon the arseno-stibio compound formed in the presence of water with a methane-sulfo derivative selected from the group consisting of formaldehyde-bisulfite and formaldehyde-sulfoxylate while neutralizing the reaction mixture.

5. The process which comprises reacting an aminophenylarsine with an aminophenylstibine chloride, one of the reacting components being substituted in the amino group by the dihydroxypropyl group, and subsequently reacting upon the arseno-stibio compound formed in the presence of water with a methane-sulfo derivative selected from the group consisting of formaldehyde-bisulfite and formaldehyde-sulfoxylate while neutralizing the reaction mixture.

6. The process which comprises reacting a hydroxy-alkylamino-phenylarsine with an aminophenylstibine compound selected from the group consisting of aminophenyl stibine-oxides and halides, and subsequently reacting upon the arseno-stibio compound formed in the presence of water with a methane-sulfo derivative selected from the group consisting of formaldehyde-bisulfite and formaldehyde-sulfoxylate while neutralizing the reaction mixture and precipitating the reaction product by pouring the solution into a water-soluble alcohol.

7. The process which comprises reacting a dihydroxypropylamino-phenylarsine with an aminophenylstibine chloride, and subsequently reacting upon the arseno-stibio compound formed in the presence of water with a methane-sulfo derivative selected from the group consisting of formaldehyde-bisulfite and formaldehyde-sulfoxylate while neutralizing the reaction mixture and precipitating the reaction product by pouring the solution into a water-soluble alcohol.

8. The process which comprises reacting an aminohydroxy-phenyl arsine with an aminohydroxy-phenyl stibine compound selected from the group consisting of aminohydroxyphenyl stibine-oxides and halides, one of the reacting components being substituted in the amino group by a hydroxyalkyl group, and subsequently reacting upon the arseno-stibio compound formed in the presence of water with a methane-sulfo derivative selected from the group consisting of formaldehyde-bisulfite and formaldehyde-sulfoxylate while neutralizing the reaction mixture and precipitating the reaction product by pouring the solution into a water-soluble alcohol.

9. The process which comprises reacting an aminohydroxy-phenyl arsine with an aminohydroxy-phenyl stibine compound selected from the group consisting of aminohydroxyphenyl stibine-oxides and halides, one of the reacting components being substituted in the amino group by the dihydroxypropyl group, and subsequently reacting upon the arseno-stibio compound formed in the presence of water with a methane-sulfo derivative selected from the group consisting of formaldehyde-bisulfite and formaldehyde-sulfoxylate while neutralizing the reaction mixture and precipitating the reaction product by pouring the solution into a water-soluble alcohol.

10. The process which comprises reacting 3-dihydroxypropylamino-4-hydroxyphenyl arsine acetate in the presence of methyl alcohol with 3-amino-4-hydroxyphenylstibine chloride, and subsequently reacting upon the arseno-stibio compound formed with formaldehyde-bisulfite while neutralizing the reaction mixture with caustic soda solution and precipitating the reaction product by pouring the reaction mixture into a water-soluble alcohol.

11. Arseno-stibio compounds corresponding to the general formula:

$$\begin{matrix} As- \\ \| \\ Sb- \end{matrix} \quad \begin{Bmatrix} -Ar-N\diagdown_{R_2}^{R_1} \\ -Ar-N-R_1 \\ \quad\;\; | \\ \quad\;\; R_2 \end{Bmatrix}$$

wherein Ar stands for an aromatic radical of the benzene series, one $R_1$ stands for an aliphatic group substituted by at least one hydroxyl group, the other $R_1$ stands for a methane-sulfo group selected from the group consisting of $NaO_3S-CH_2-$ and $NaO_2S-CH_2-$ groups, and $R_2$ is hydrogen or a hydroxyalkyl group, which arseno-stibio compounds are yellow to brown substances, insoluble in alcohols, yielding neutral aqueous solutions which are suitable for injection.

12. Arseno-stibio compounds corresponding to the general formula:

$$\begin{matrix} As- \\ \| \\ Sb- \end{matrix} \quad \begin{Bmatrix} -Ar-N\diagdown_{R_2}^{R_1} \\ -Ar-N-R_1 \\ \quad\;\; | \\ \quad\;\; R_2 \end{Bmatrix}$$

wherein Ar stands for an aromatic radical of the benzene series, one $R_1$ stands for a hydroxyalkyl group of 3 to 6 carbon atoms, the other $R_1$ stands for a methane-sulfo group selected from the group consisting of $NaO_3S-CH_2-$ and $NaO_2S-CH_2-$ groups and $R_2$ is hydrogen or a hydroxyalkyl group of 3 to 6 carbon atoms, which arseno-stibio compounds are yellow to brown substances, insoluble in alcohols, yielding neutral aqueous solutions which are suitable for injection.

13. Arseno-stibio compounds corresponding to the general formula:

$$\begin{matrix} As- \\ \| \\ Sb- \end{matrix} \quad \begin{Bmatrix} -Ar-N\diagdown_{R_2}^{R_1} \\ -Ar-N-R_1 \\ \quad\;\; | \\ \quad\;\; R_2 \end{Bmatrix}$$

wherein Ar stands for an aromatic radical of the benzene series, one $R_1$ stands for a dihydroxypropyl group, the other $R_1$ stands for a methane-sulfo group selected from the group consisting of $NaO_3S-CH_2-$ and $NaO_2S-CH_2-$ groups and $R_2$ is hydrogen or a dihydroxypropyl group, which arseno-stibio compounds are yellow to brown substances, insoluble in alcohols, yielding neutral aqueous solutions which are suitable for injection.

14. Arseno-stibio compounds corresponding to the general formula:

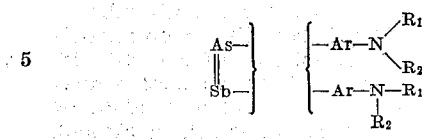

wherein Ar stands for a hydroxyphenyl group, one $R_1$ stands for an aliphatic group substituted by at least one hydroxyl group, the other $R_1$ stands for a methane-sulfo group selected from the group consisting of $NaO_3S-CH_2-$ and $NaO_2S-CH_2-$ groups and $R_2$ is hydrogen or a hydroxyalkyl group, which arseno-stibio compounds are yellow to brown substances, insoluble in alcohols, yielding neutral aqueous solutions which are suitable for injection.

15. Arseno-stibio compounds corresponding to the general formula:

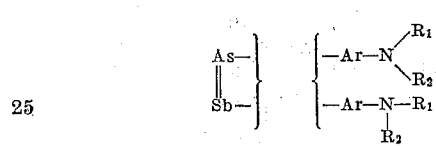

wherein Ar stands for a hydroxyphenyl group, one $R_1$ stands for a hydroxyalkyl group of 3–6 carbon atoms, the other $R_1$ stands for a methane-sulfo group selected from the group consisting of $NaO_3S-CH_2-$ and $NaO_2S-CH_2-$ groups and $R_2$ is hydrogen or a hydroxyalkyl group of 3 to 6 carbon atoms, which arseno-stibio compounds are yellow to brown substances, insoluble in alcohols, yielding neutral aqueous solutions which are suitable for injection.

16. Arseno-stibio compounds corresponding to the general formula:

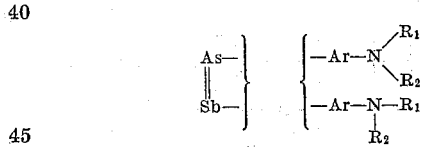

wherein Ar stands for a hydroxyphenyl group, one $R_1$ stands for a dihydroxypropyl group, the other $R_1$ stands for a methane-sulfo group selected from the group consisting of $NaO_3S-CH_2-$ and $NaO_2S-CH_2-$ groups and $R_2$ is hydrogen or a dihydroxypropyl group, which arseno-stibio compounds are yellow to brown substances, insoluble in alcohols, yielding neutral aqueous solutions which are suitable for injection.

17. Arseno-stibio compounds corresponding to the general formula:

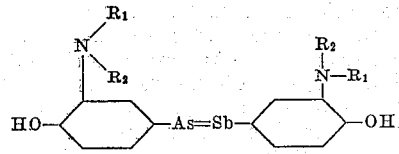

wherein one $R_1$ stands for a hydroxyalkyl group of 3 to 6 carbon atoms, the other $R_1$ stands for a methane-sulfo group selected from the group consisting of $NaO_3S-CH_2-$ and $NaO_2S-CH_2-$ groups and $R_2$ is hydrogen or a hydroxyalkyl group of 3 to 6 carbon atoms, which arseno-stibio compounds are yellow to brown substances, insoluble in alcohols, yielding neutral aqueous solutions which are suitable for injection.

18. Arseno-stibio compounds corresponding to the general formula:

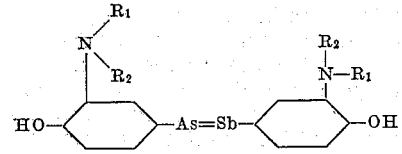

wherein one $R_1$ stands for a dihydroxypropyl group, the other $R_1$ stands for a methane-sulfo group selected from the group consisting of $NaO_3S-CH_2-$ and $NaO_2S-CH_2-$ groups, and $R_2$ is hydrogen or a dihydroxypropyl group, which arseno-stibio compounds are yellow to brown substances, insoluble in alcohols, yielding neutral aqueous solutions which are suitable for injection.

19. The arseno-stibio compound corresponding to the formula:

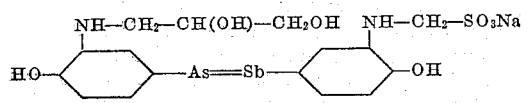

which compound is a yellow substance and dissolves in water to a neutral solution suitable for injection.

20. The arseno-stibio compound corresponding to the formula:

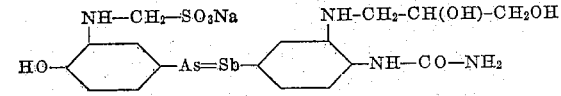

which compound is a yellow substance and dissolves in water to a neutral solution suitable for injection.

HANS SCHMIDT.